US005101959A

United States Patent [19]

Whitby

[11] Patent Number: 5,101,959

[45] Date of Patent: Apr. 7, 1992

[54] ALIGNING DEVICE FOR CONVEYED ARTICLES

[75] Inventor: Michael A. Whitby, West Milton, Ohio

[73] Assignee: Premark FEG Corporation, Wilmington, Del.

[21] Appl. No.: 641,019

[22] Filed: Jan. 14, 1991

[51] Int. Cl.[5] .......... B65G 47/26

[52] U.S. Cl. .......... 198/456; 198/636

[58] Field of Search .......... 198/382, 399, 416, 456, 198/599, 636

[56] References Cited

U.S. PATENT DOCUMENTS

| | | | |
|---|---|---|---|
| 2,602,554 | 7/1952 | Griffith | 198/456 X |
| 2,771,176 | 11/1956 | Clark et al. | 198/636 |
| 2,781,119 | 2/1957 | Talbot et al. | 198/636 |
| 3,089,576 | 5/1963 | Sauer et al. | 198/456 X |
| 3,470,997 | 10/1969 | Trounce | 198/456 X |
| 3,598,227 | 8/1971 | Stanford | 198/456 X |
| 3,830,359 | 8/1974 | Fogelberg | 198/636 X |
| 4,805,760 | 2/1989 | Treiber | 198/456 |

FOREIGN PATENT DOCUMENTS

| | | | |
|---|---|---|---|
| 0803036 | 2/1951 | Fed. Rep. of Germany | 198/456 |
| 1110726 | 8/1984 | U.S.S.R. | 198/636 |
| 1266815 | 10/1986 | U.S.S.R. | 198/636 |
| 1406094 | 6/1988 | U.S.S.R. | 198/636 |

*Primary Examiner*—Robert P. Olszewski
*Assistant Examiner*—James R. Bidwell
*Attorney, Agent, or Firm*—Russell L. McIlwain

[57] ABSTRACT

An article conveyor and package aligner comprises a pair of guide members converging from an infeed station to an outfeed station, a conveyor for moving articles toward the outfeed station, and a pair of levers, one connected to each guide member, below the conveyor. The levers are cantilevered, each carrying a latching pin or roller and a notch cooperating with a similar pin and roller and notch on the other lever. The levers lie closely adjacent and cross each other so as to comprise an escapement mechanism which is in either an "at rest" condition, a locked condition or a released condition, depending on the position of a package traveling along the conveyor and the relation of that package to one or both of the guide members. A package contacting one guide member causes locking of the escapement mechanism and thereby of the guide member which is so contacted, forcing the package laterally until it contacts the other guide member. At the time it contacts the second guide member, the package has been properly aligned with the machine to which it is being fed. The second contact releases the escapement mechanism, thereby freeing both guide members and permitting unencumbered passage of the package toward the outfeed station.

10 Claims, 2 Drawing Sheets

ALIGNING DEVICE FOR CONVEYED ARTICLES

This invention is a variation of and an improvement in a device for centering packages and other articles, as disclosed in U.S. Pat. No. 4,805,760 granted on Feb. 21, 1989 to Fritz F. Treiber and reissued as U.S. Pat. No. Re 33,511 on Jan. 1, 1991, entitled "Package Positioning Apparatus and Method".

BACKGROUND OF THE INVENTION

In the production of many different kinds of products, articles are conveyed along a given path to a machine which performs certain functions or operations thereon. In the case of meat or produce which is commonly placed on trays and wrapped in transparent film for display and sale in a supermarket, trayed product is typically manually located on a conveyor and forwarded to a wrapping machine. At a wrapping station within the machine, a length of film is pulled from a continuous supply roll, placed over the top of the package, cut into a sheet and the package is elevated into the sheet of film. Once elevated, the film is overlappingly tucked under the tray for downstream heat sealing to complete package wrapping.

The mechanism for performing the wrapping is complex mechanically. It requires that the edges of the package be located rather precisely within the machine. The front, rear and side edges must be properly positioned relative to the film sheet which has been created, not only to provide proper overlapping of the film beneath the tray, but also to avoid damage to the packages or machine and resulting lost production. Damage can occur when packages which are misaligned relative to the wrapping mechanism are elevated into operating parts which perform various of the necessary film stretching and tucking functions. The aforementioned U.S. Pat. No. 4,805,760 is a predecessor design of that disclosed and claimed herein and is for the same end purpose.

Other patents which are known to provide the intended function of aligning an article with respect to its conveyor are U.S. Pat. No. 3,089,576 issued to Sauer et al., U.S. Pat. No. 3,194,710 issued to Stremke et al. and U.S. Pat. No. 3,470,997 issued to Trounce, all of which were patent references cited against the '760 U.S. patent noted above.

SUMMARY OF THE INVENTION

The invention relates to a novel escapement type of mechanism which provides for "squaring" a rectangular or other shape package being pushed along a conveyor, causes the package to be moved laterally of the conveyor upon contact with one of a pair of converging spaced-apart arms or guide members between which the package is conveyed, and discontinues lateral movement once the package has been aligned with the machine to which it being fed. The escapement mechanism includes a pair of cantilevered, elongated levers, one connected to each guide member to pivot therewith. The levers lie closely adjacent and cross each other. Each lever is provided with a latching pin and notch which cooperate with a similar pin and notch on the other lever to provide locking and releasing functions for the guide members. Locking of one lever occurs in order to prevent all but a minor outward movement of its associated guide arm. The outward movement is inhibited until the necessary lateral forcing of a package has been completed to align the package with the conveyor. At that time, engagement of the package with the other guide member disables the first locking mechanism and maintains the locking mechanism for both levers in unlocked or released condition throughout package travel between the guide members.

The principal object of this invention is to provide a unique locking and releasing mechanism for a pair of converging, spaced-apart guide members between which packages are conveyed en route to a machine with which the packages much be centered.

Another object of the invention is to provide such a locking and releasing mechanism which is highly reliable, simple in design, inexpensive to manufacture and less subject to wear of the locking and releasing elements than predecessor designs intended for similar purposes.

Other objects and advantages will be apparent from the following description, in which reference is made to the accompanying drawings.

IN THE DRAWINGS

DESCRIPTION OF THE PREFERRED EMBODIMENT

For background purposes to illustrate one type of environment in which this invention is preferably embodied, reference is made to U.S. Pat. No. 4,958,479 granted on Sept. 25, 1990 to Fritz F. Treiber. This patent and the aforementioned U.S. Pat. No. 4,805,760 are both incorporated herein by reference for a full understanding not only of an environment in which this invention is useful, but also for comparison of the improvements in this invention over that disclosed in the '760 patent.

Figure 1:
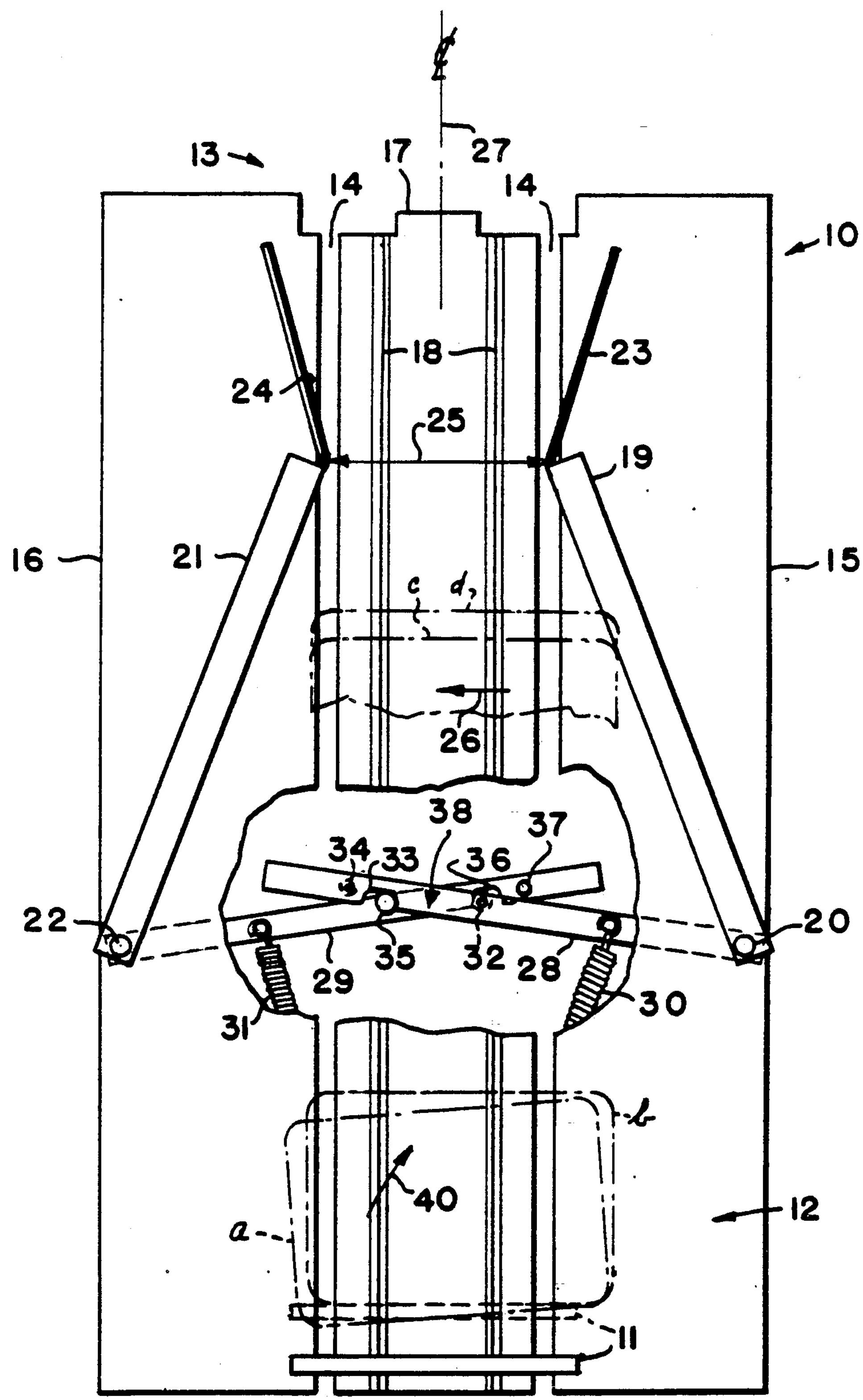
FIG. 1 is a plan view of a table along which packages are conveyed, illustrating a pair of converging guide members and levers in their "at rest" conditions.
Figure 2:
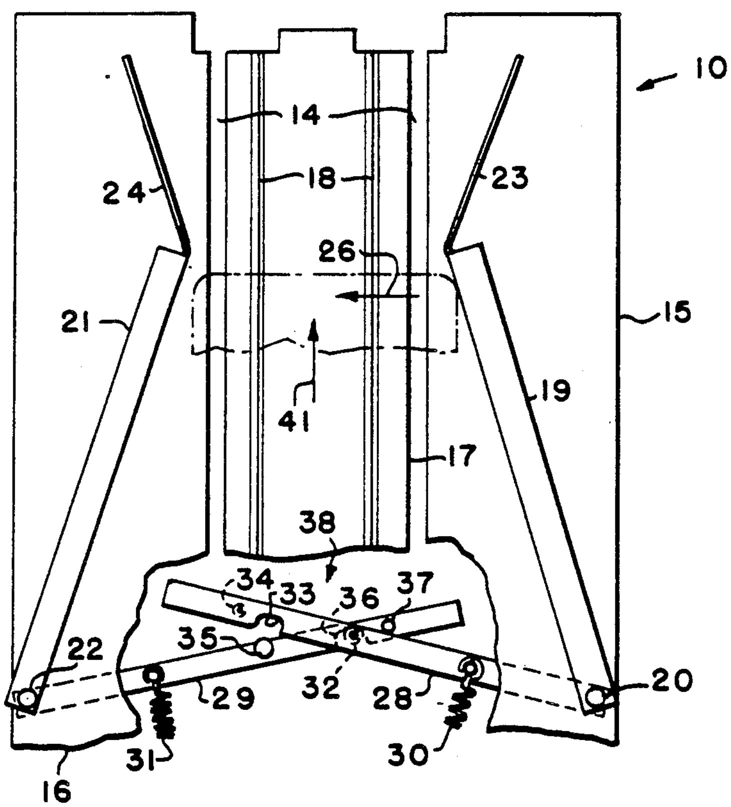
FIG. 2 is a view similar to FIG. 1 showing a misaligned package being forced laterally of the conveyor toward an alignment condition as the package is being fed forwardly toward a machine.
Figure 3:
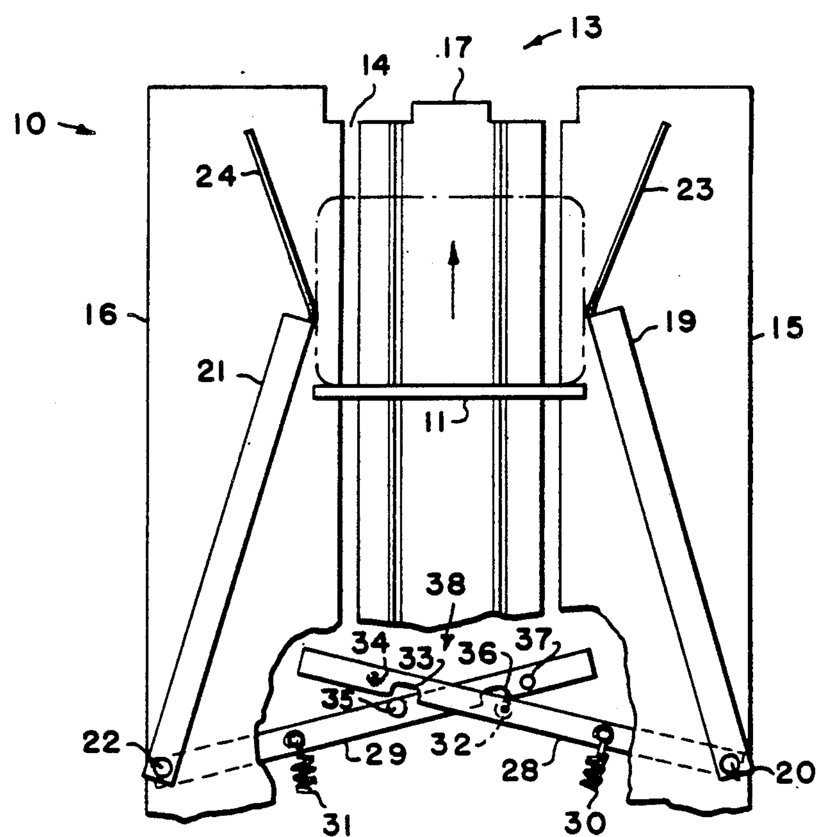
FIG. 3 is a view similar to FIGS. 1 and 2 in which a centered package which has been forced laterally has already contacted the second guide member, released the locking means and enabled the package to move unencumbered in proper alignment toward the machine.

FIGS. 1-3 illustrate plan views of a combined article conveyor and package aligner 10. Conveying is performed by a pair of pushers 11 (only one of which is shown in full lines in FIG. 1) in an "at rest" condition, ready to push a package from an infeed station 12 to an outfeed station 13. Any type of conveyor may be used, including a belt, providing there is either a pusher for timing entry of packages into the machine, or sufficient friction between the belt and the articles in the case of conveyors in which timing is not essential and no pusher is required. The pusher is driven by a pair of chains (not shown) which have upstanding portions passing from beneath a conveyor table between slots 14. The table consists of two side panels 15 and 16 and a center panel 17. The panels are preferably a heavy gauge sheet of stainless steel, and are coplaner. The table is essentially horizontal but may be inclined upwardly. The panels 15, 16 and 17 are interconnected by framework (not shown) and form a subassembly which may be removably attached to the machine. The subassembly contains the chain mechanism mentioned above for moving the pair of pushers 11 from the station 12 to station 13 by means of structure such as shown in the above '479 patent. The subassembly also controls film width and length measuring means to be described only generally below. Since neither the details of the subassembly nor the drive mechanism for the pushers are essential for a full and complete understanding of this invention, they will not be described further except as they may be essential to appreciate what is being claimed. Center panel 17 of the table is preferably provided with a plurality of narrow ribs 18 standing a small distance above the surface of the center panel so as to minimize friction between the packages and table during movement from the infeed to the outfeed stations. The ribs are preferably formed in the sheet of panel 17 as a radiused, inverted "V".

A first guide member 19 is mounted on side panel 15 on a pivotable shaft 20. A second guide member 21 is mounted on the side panel 16 on a pivotable shaft 22. The members 19 and 21 converge from their pivot points toward the outfeed station and are provided at the ends remote from the shafts 20 and 22 with extensions 23 and 24, respectively, which diverge from a throat 25. The throat 25 may be defined as the distance between the closest edges of the guide arms 19 and 21 where a package can pass between the guide members.

For purposes of explanation only, the guide members 19 and 21 have been designated first and second guide members, respectively. It should be understood that they perform identical functions of moving packages laterally right to left as indicated by arrow 26 in FIG. 1, or from left to right if the package placed in the infeed station is on the leftward side of a centerline 27 and needs to be pushed rightwardly for alignment with the machine.

The elements described thus far are essentially the same as in the system illustrated in the '760 patent. Those elements and their functions which are now about to be described are the primary area of difference between that of the '760 patent and this invention.

The improvement comprises first and second cantilevered, elongated levers 28 and 29. The levers 28 and 29 are connected to the shafts 20 and 22, respectively, so as to move with the respective guide member as the guide member is pivoted. For explanation purposes, each connected guide member, lever and shaft provides a bell crank function, so that as lever 19 moves clockwise when it is contacted by a package, for example, its associated lever 28 will also move clockwise through the same angle. The levers 28 and 29 and their guide members are urged toward the infeed station 12 by means of tension springs 30 and 31, respectively. The ends of springs 30 and 31 remote from their connecting pins with the levers 28 and 29 are anchored to structure which is part of the subassembly article conveyor and package aligner 10.

Lever 28 is provided with a latching pin or roller 32, a notch 33 and a stop pin 34, in that order, extending outwardly from the shaft 20. Pins 32 and 34 face downwardly as shown in FIG. 1. Lever 29 contains similar pins and a notch, designated 35, 36 and 37 in the order in which they extend outwardly from shaft 22. The levers 28 and 29 may be in the order of ¼" thick and pins 32, 34, 35 and 37 are slightly longer than the thickness of the levers. At a crossing point 38, the levers 28 and 29 are in contact or near contact, so that the bottom face of lever 28 and the upper face of lever 29 as viewed in FIG. 1 are always closely adjacent, and may even touch lightly.

Notches 33 and 36 are elongated, in the embodiment shown, an extent approximating one radius greater than the diameter of the latching pins or rollers 32 and 35. The purpose of this will become apparent in connection with the description attending FIG. 2. With the levers 28 and 29 being in their "at rest" condition of FIG. 1, it will be seen that latching pin 32 abuts the left end of notch 36 and latching pin 35 abuts the right end of the notch 33. At the same time, stop pins 34 and 37 rest against the forward edges of the levers they contact. The force applied by the springs 30 and 31 to maintain them in this condition is preferably such as will permit a lightweight package to contact one of the guide arms without moving the arm outwardly, be moved laterally, centered and then have the pusher 11 force both guide arms 19 and 21 outwardly simultaneously to release both levers 28 and 29 of the escapement mechanism as shown in FIG. 3. The term release is a misnomer under this condition, but is used to avoid confusion with the description of what happens when heavier packages are being aligned. The release action occurs when both guide arms are free to move outwardly as the package makes contact with both arms and continues until it passes between the throat 25. However, in the illustrated embodiment, when a package of produce weighing approximately two pounds or greater is pushed along by pusher 11, the first-contacted guide member will pivot through a very small angle until the first lever causes its notch to become free of the cooperating latching pin on the other lever and also causes the latching pin of the first lever to lock with the cooperating notch on the other lever. The locking function occurs in order to force the package laterally toward the other guide member once the first guide member has been prevented from moving further outwardly.

Operation of the Preferred Embodiment

Having described the key elements of my mechanism, let us now assume that a package is to be placed in the infeed station 12 and conveyed toward the outfeed station 13 to the machine. Placement may be done manually, or by being received from another conveyor. The successive positions of the package (shown in dot-dash lines in all of the Figures) will be designated "a–f". If the operator places the trayed product on the table in position "a", contact by pusher 11 when it moves to the dotted line position in FIG. 1 will "square" the package to the position shown as "b", by essentially rocking it around arrow 40. At this time, the leading and trailing edges of the package will be perpendicular to the path of travel of the package toward the machine. When the package of the size shown arrives at position "c", it will make contact with the first guide member 19. If the package is of such light weight that the force on spring 30 will not be overcome, the package will be moved laterally immediately in a leftward direction as shown by arrow 26, while it is simultaneously being pushed toward the outfeed station 13. Once the package contacts guide member 21, the forward corners of the package will force both guide members 19 and 21 outwardly as the packages are pushed along by the pusher 11. The force of the packages against guide members 19 and 21 overcomes the counter force of springs 30 and 31. When this occurs, the escapement mechanism consisting of the levers, pins and notches will assume conditions essentially as shown in FIG. 3. Thus, both will release at the same time and remain in this condition as the package passes forwardly along centerline 27 of the package aligner 10. If both guide members are contacted simultaneously by a package, both levers 28 and 29 move simultaneously, the notches move away from the pins and no contact is made between the pins and notch ends. In this case, there is no wear of parts when packages happen to be centered as placed into the infeed station 12.

If, however, package weight is such as to overcome the tension in spring 30, a package making contact as shown at position "c" will begin to move guide member 19 clockwise until the package assumes position "d". The amount of movement that will be allowed can be noted in FIG. 2 where guide member 19 has caused its lever 28 to lift notch 33 away from latching pin 35. Further clockwise movement is arrested by pin or roller 32 abutting the right or laterally outward end of notch 36. It will be seen that lever 29 and its associated guide member 21 moved counterclockwise a small amount. The amount is the result of play required until latching pin 32 reaches the right end of notch 36 as shown in FIG. 2.

Once guide member 19 is locked in position, the package will be gradually pushed leftwardly by the converging member 19 as shown by arrow 26. The package is simultaneously being pushed by pusher 11 in the direction of arrow 41. The illustrated package of FIG. 2 has but a slight distance further to travel before contacting guide member 21. Upon contact with guide member 21, the member 21 will move counterclockwise through a small angle causing its lever 29 to do likewise and lift notch 36 from latching pin or roller 32. The corners where notches 33 and 36 meet the edges of their respective levers are each provided with a small radius to enable smooth functioning of the parts as well as to minimize wear. Once contact with guide member 21 occurs, the levers and associated pins and notches assume the release positions shown in FIG. 3, at which time both guide members 19 and 21 move outwardly in synchronism until the lead edge of the package reaches the throat 25. Once that throat opening has been widened to the width of the package, the package assumes the position shown in FIG. 3 and will pass freely through the throat. Pusher 11, if wider than the package, will cause the guide members 19 and 21 to move further outwardly until the pusher passes through the throat 25. Pusher length across the unit is designed to assure squaring of the widest package to be accommodated, and may, in some designs be shorter than the width of the throat. If shorter, it will never contact the guide members. If the package is wider than the length of the pusher 11 across the conveyor, the guide members 19 and 21 will begin to move inwardly as soon as the trailing edge of the package passes the throat 25. The extensions 23 and 24 will maintain contact with either the trailing corners of the package or the ends of pusher 11, depending on which is wider, so that the guide members 19 and 21 and their associated levers 28 and 29 will return uniformly toward the "at rest" condition shown in FIG. 1. The angles of the extensions 23 and 24 are important in order to achieve a uniform return of the levers to the condition shown in FIG. 1, so that clearance between the latching pins and notches is maintained during the return.

While I address the squaring of rectangular packages, circular or other shaped articles can be aligned in similar fashion. A circular article will roll across the face of the pusher while moving laterally.

The described invention accommodates a large range of package widths, from a lower end of a range which may be slightly less than the throat dimension to an upper end which may be the outward limits of movement of the guide members. The pins 34 and 37 also act as a stop means for limiting the outward movement of the interengaging levers and their guide members.

Also, packages or articles can be aligned with an edge of the conveyor or some feed line other than the centerline.

Having described my invention, I claim:

1. In a flat-surfaced article conveyor having an infeed station for receiving articles therein, an outfeed station toward which articles are conveyed and an article pusher for moving articles from the infeed station to the outfeed station, improved article alignment apparatus for positioning misaligned articles laterally with respect to the conveyor during passage of the articles from the infeed station to the outfeed station comprising:

first and second laterally-movable guide members positioned above and on opposite sides of said conveyor and converging from the infeed station toward the outfeed station when in an article positioning orientation to define a throat extending across the conveyor;

a pivot for each of said guide members, said pivots being located along the outer edges of said conveyor toward the infeed station and having their axes perpendicular to the surface of the conveyor;

cantilevered first and second elongated levers each having one end operatively connected to said first and second guide members at said pivots, respectively, beneath said conveyor;

means biasing said guide members and levers toward each other and toward said article positioning orientation;

releasable locking means on said first and second levers for determining whether an article being conveyed is aligned with or misaligned relative to a desired lateral alignment with the conveyor, alignment being indicated by article contact with both guide members essentially simultaneously and misalignment being indicated by initial article contact with one only of said guide members, said releasable locking means comprising each of said levers having, in the direction from its pivotal end toward its free end a latching pin and an elongated notch in that order, said pins extending parallel to said pivotal axes and said notches being on those edges of the levers facing toward the infeed station;

the free ends of said levers extending across each other in overlapping, closely adjacent fashion;

said biasing means urging said levers, before contact by a package, toward the infeed end of the conveyor to a first rest condition in which an end of each notch abuts the latching pin of the other lever, toward a second active locking condition wherein one of the levers causes its notch to release the latching pin of the other lever in response to package contact with its corresponding guide member, and moves its own latch pin into abutting relationship with an end of the cooperating notch on the other lever, at which time the contacted guide member locks and urges the package laterally toward the opposite side of the conveyor; and, said locking means continuing to cause the contacted guide member to force the package laterally until the package contacts the opposing guide member, at which time contact therewith moves its corresponding lever to release its notch from the latching pin of the other lever, release of both notches and latching pins continuing after the package is properly aligned until the package passes through said throat.

2. The article alignment apparatus of claim 1 wherein said guide members and levers are essentially symmetrical with a centerline of said conveyor.

3. The article alignment apparatus of claim 1 including a stop pin on each lever beyond the notch toward the end of the lever and wherein said latching pins and notches are engaged and the stop on each lever contacts that edge of the other lever toward the outfeed station when said levers are in their first rest condition, thereby acting as a stop means limiting lever movement toward the infeed station and closing the throat to its narrowest opening.

4. The article alignment apparatus of claim 3 wherein said narrowest throat opening is essentially the width of the narrowest width package to be fed along said conveyor.

5. The article alignment apparatus of claim 3 wherein said narrowest throat opening is wider than the width of the narrowest width package, whereby a narrow width package which is properly aligned with the conveyor may pass between the guide members without contacting either guide member.

6. The article alignment apparatus of claim 3 wherein said stop pins limit outward movement of the guide members to essentially the maximum width throat opening.

7. The article alignment apparatus of claim 1, wherein said biasing means includes a tension spring connected to each lever, said springs applying force to said levers in the direction toward the infeed station when the levers are in said first rest condition.

8. The article alignment apparatus of claim 7 wherein the force required to overcome each spring is sufficiently great that a heavy package will move a first-contacted guide member and overcome its spring force before such heavy package is moved laterally, but wherein a light package may not overcome such force, in which case the light package will be immediately moved laterally until both guide members are contacted thereby and said releasable locking means functions in response to package movement from said pushers to permit passage of a package without the levers having ever reached said second active locking condition.

9. The article alignment apparatus of claim 1 wherein said converging guide members have diverging extensions at their ends toward the outfeed station from the throat, said diverging extensions being essentially at the same angles on opposite sides of a centerline of the conveyor.

10. The article alignment apparatus of claim 9 wherein said biasing means comprises a spring acting on each lever, said springs applying essentially the same force of said guide members toward said centerline.

* * * * *